United States Patent Office 3,315,290
Patented Apr. 25, 1967

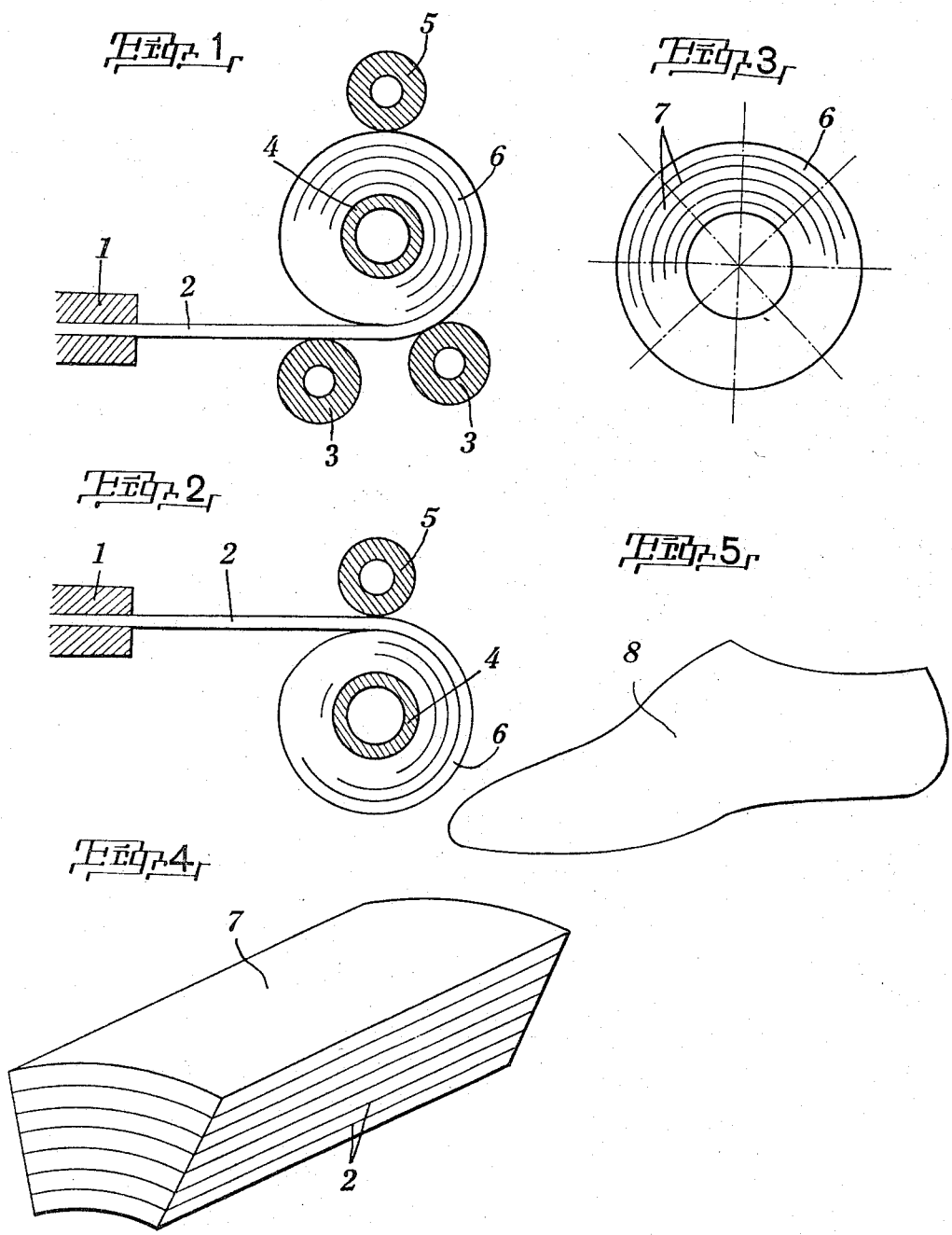

3,315,290
METHOD FOR THE MANUFACTURE OF SHOE PATTERN
Katsurou Ishii, Osaka-shi, Japan, assignor to Sankyo Kasei K.K.
Filed Sept. 11, 1964, Ser. No. 395,868
Claims priority, application Japan, Oct. 24, 1963, 38/56,931
3 Claims. (Cl. 12—146)

This invention relates to a method for the manufacture of shoe pattern, more particularly to the method for the manufacture of shoe pattern by using polyethylene resins and the like as the materials.

The principal object of the present invention is to inject thermosetting resins softened by preheating in advance into a sheet (flat plate) form, wind it into a cylindrical form, divide the resulting materials having a tightly and evenly pressed and laminated thick part to obtain the shoe pattern.

Another principal object of the present invention is to form a hollow part in the winding drum, when the winding and lamination of soft plastic sheets are carried out, perform the winding thereof with cooling effected by passing the water through the hollow part at any time and obtain the shoe pattern from the materials obtained by dividing the said laminated cylinder in a longitudinal direction.

Further object of the present invention is to provide at the key points of winding drum the pressure rolls exerted with pressure from the outside when the winding and lamination of plastic sheets are carried out on the hollow winding drum, tightly and evenly pressing the wound laminated surfaces and dividing the laminated cylinder to obtain the shoe pattern.

The present invention is to prevent foam buildup inside by using sheets of plastic materials such as polyethylene resins and the like and preparing special cylindrical laminated body therefrom and to obtain respective shoe pattern from the divided pieces of the said laminated body. The purpose of the present invention is to massproduce new shoe patterns more excellent in various respects than the conventional wood patterns.

As the name of so-called "wood pattern" implies, the conventional shoe patterns have been heretofore obtained from such materials as special lumbers originated outside Japan by planing logs, but as the materials are originated outside Japan, sometimes the materials have been hard to procure and the price of materials has been sometimes relatively expensive. Also, due to dry lumber, elongation, contraction, deformation, cracking, corrosion or other troubles in respect of weathering tend to take place. Further, the durability of the conventional patterns is not sufficient. For these reasons, it has been recently observed that polyethylene resins and the like are molded into block by means of low pressure molding and undergo the planing processing, but the foams are produced inside the block upon molding the block. The foams resemble so called blowhole in the casting. Since the block is obtained by extruding mold, air tends to be introduced in the extruding mold and remain in the block as such, or owing to block thickness at the cooling, cooling rate remarkably differs at the outer part and the center of the block, whereby the foams are produced. When the mold product undergoes planing, the foamed part is inevitably exposed. Particularly, the foams tend to concentrate around the seam of a pair of split blocks when the split mold is used. Therefore, the expenditure of planing processing as well as the loss of materials are very remarkable in this case.

To eliminate the said disadvantages, the present invention is characterized by winding plastic materials such as polyethylene resin and the like subjected to extruding mold through dies into a sheet form on the winding core such as drum and the lime under tension to obtain cylindrical laminated body, lamination surfaces thereof being fused and integrated through adhesion with one another, dividing the resulting laminated body into pieces along on axial direction, and planing the resulting divided pieces to obtain the desired pattern, whereby the plastic shoe patterns without foams are obtained.

FIGURE 1 is an explanatory drawing of one embodiment of means for forming cylindrical laminated body from the material sheets according to the method of the present invention, FIGURE 2 an explanatory drawing of another embodiment, FIGURE 3 a front view of cylindrical laminated body, FIGURE 4 an oblique view of divided piece, and FIGURE 5 a front view of the product.

Further explanation of the present invention will be made hereunder in detail with reference to the drawings. In the first place, polyethylene resin materials or mixed materials thereof with foaming agent are subjected to extruding mold through dies 1 such as T die and the like into sheets 2 of 0.5 to 1.0 mm. thickness, and the resulting sheets 2 are wound successively in a circular form directly onto the winding drum 4 through suitable winding rolls 3, where rolls 3 and drum 4 are all prepared as the hollow bodies so that the cooling water may be suitably passed therethrough. Further, in the present invention, a tension roll 5 is provided at a suitable position on the surface of the sheet 2 to be wound to give the sheet 2 desired pressing and tension. In this way, a definite pressing is applied to the lamination surfaces while the sheet 2 undergoes winding and lamination. At the same time, all the laminated surfaces are integrally fused and adhered with one another by self-heat, or by heating from other source and heat insulation. Those wound up to a specified diameter are taken off from the winding drum 4 to obtain the cylindrical laminated body 6. For example, the laminated body 6 is designed to be 1 mm. in inner diameter and 1.20 to 1.80 mm. in outer diameter.

Then, the laminated body 6 is divided into several divided pieces 7 radially along the axial direction, whereby the divided pieces 7 exhibit a shape of fan in their cross-section. By planing the resulting divided piece 7 the product 8 consisting of one mold pattern or a pair of split patterns is obtained.

Specific gravity of polyethylene resin is 0.955 and that of foamed one is about 0.6 to 0.7. They are slightly lighter than the wood pattern, but have no practical trouble at all. Their handling is rather convenient. The laminated body 6 is divided radially along the axial direction in the above, but the direction of division is quite free and is not specified.

As stated above, in the present invention, the materials from which product 8 is obtained by planing are obtained from the cylindrical laminated body 6 produced in the first place by winding sheets 2 obtained by the extruding mold into a sheet form onto the winding drum under the pressing condition so that the tension may be given constantly to the winding surface. Therefore, the foams generated on the surface of sheet 1 and the laminated layers thereof are squeezed out of body by winding under the said tension, and no room for foam generation exists, resulting in easy production of the laminated body 6 completely free of foams.

Accordingly, the divided piece 7 obtained by dividing the laminated body has no foams entirely inside and becomes an even and compact block in its entirety. By planing the said block, excellent plastic pattern having no cavities can be readily obtained. The plastic pattern, therefore, has not such disadvantages of elongation, contraction, and deformation due to temperature and humidity, nor deterioration not corrosion at all, as compared with the wood pattern, so that the dimensioning of pattern can be correctly and precisely carried out. Further, the block of the present invention is more excellent than the conventional plastic product owing to no foams and cavities inside at all. The conventional block extruding mold requires longer period of time for one shot with increased thickness, while in the present invention, a large amount of laminated bodies 6 can be continuously obtained in a short period of time because the thickness of block can be increased by winding thin sheet 2 into a laminated body. At the same time, the divided piece 7 can be readily obtained in the shape of fan in its cross-section as illustrated in the drawing hereto attached, and therefore the planing can be extremely easily and rapidly realized in processing the block into a pattern with large bottom and narrow top. As compared with the conventional wood and plastic patterns, molding can be readily effected with simple means and an excellent product can be obtained as well. In many respects, the present invention has better utility.

I claim:
1. A process for manufacturing shoe patterns comprising extruding thermosetting plastic material into sheet form, winding said plastic sheet on a water cooled hollow drum while maintaining the sheets to be wound and the already wound sheets under pressure to produce a compacted bubble-free cylindrically laminated body the surfaces of which thus fuse together, dividing the resulting laminated body into segments along an axial direction and planing the resulting segments to obtain a shoe pattern.

2. A process as in claim 1, wherein the plastic sheets to be laminated are put under tension by means of tension rollers and the already wound sheets are compacted by means of a compacting roller to exclude the formation of air bubbles between sheets.

3. A shoe pattern produced by the method of claim 1.

References Cited by the Examiner

UNITED STATES PATENTS

| | | | |
|---|---|---|---|
| 1,844,647 | 2/1932 | Everett | 156—193 |
| 2,433,042 | 12/1947 | Graham | 156—193 |
| 3,045,285 | 7/1962 | Baird et al. | |
| 3,231,655 | 1/1966 | Larsen | 15—244 |

FOREIGN PATENTS

| | | |
|---|---|---|
| 174,352 | 1/1922 | Great Britain. |
| 116,250 | 5/1958 | Russia. |

PATRICK D. LAWSON, *Primary Examiner.*